United States Patent
Begeja et al.

(10) Patent No.: US 11,392,983 B2
(45) Date of Patent: Jul. 19, 2022

(54) APPARATUSES AND METHODS FOR IDENTIFYING CONTENT DISTRIBUTION OPPORTUNITIES IN ACCORDANCE WITH ADVERTISING PERFORMANCE

(71) Applicants: AT&T Intellectual Property I, L.P., Atlanta, GA (US); Xandr Inc., New York, NY (US)

(72) Inventors: Lee Begeja, Gillette, NJ (US); Eric Zavesky, Austin, TX (US); Samuel Seljan, Portland, OR (US); Ashutosh Sanzgiri, Portland, OR (US); David Crawford Gibbon, Lincroft, NJ (US)

(73) Assignees: AT&T Intellectual Property I, L.P., Atlanta, GA (US); Xandr Inc., New York, NY (US)

( * ) Notice: Subject to any disclaimer, the term of this patent is extended or adjusted under 35 U.S.C. 154(b) by 0 days.

(21) Appl. No.: 16/854,972

(22) Filed: Apr. 22, 2020

(65) Prior Publication Data

US 2021/0334846 A1    Oct. 28, 2021

(51) Int. Cl.
*G06Q 30/02* (2012.01)
(52) U.S. Cl.
CPC ..... *G06Q 30/0246* (2013.01); *G06Q 30/0245* (2013.01); *G06Q 30/0275* (2013.01)
(58) Field of Classification Search
CPC ............ G06Q 30/0244; G06Q 30/0201; H04L 12/1881; G06F 3/013; G06F 16/7867; H04N 21/25891; H04N 21/812
See application file for complete search history.

(56) References Cited

U.S. PATENT DOCUMENTS

| | | | |
|---|---|---|---|
| 2008/0059288 A1* | 3/2008 | Kokernak | G06Q 30/0201 705/14.41 |
| 2010/0262487 A1 | 10/2010 | Edwards et al. | |
| 2010/0324988 A1* | 12/2010 | Schaar | H04N 21/812 705/14.42 |
| 2014/0074591 A1* | 3/2014 | Allen | G06Q 30/0244 705/14.43 |
| 2015/0206180 A1* | 7/2015 | Iyer | G06Q 30/0256 705/14.49 |
| 2015/0254734 A1* | 9/2015 | Scotto | H04L 12/1881 705/14.73 |

(Continued)

OTHER PUBLICATIONS

Juan, Yu-Chin, "CTR Prediction: From Linear Models to Field-Aware Factorization Machines", Criteo AI Lab, Mar. 17, 2020, 4 pages.

(Continued)

*Primary Examiner* — Saba Dagnew
(74) *Attorney, Agent, or Firm* — Guntin & Gust, PLC; Mark Wilinski

(57) ABSTRACT

Aspects of the subject disclosure may include, for example, monitoring a performance of a creative presented by a first plurality of client devices in conjunction with a distribution of a first content item via a first outlet, determining that the performance exceeds a threshold, responsive to the determining that the performance exceeds the threshold, identifying a second outlet to distribute the first content item, and providing the first content item to the second outlet responsive to the identifying of the second outlet. Other embodiments are disclosed.

20 Claims, 7 Drawing Sheets

(56) References Cited

U.S. PATENT DOCUMENTS

2015/0309566 A1* 10/2015 Hampiholi .............. G06F 3/013
  345/156
2015/0365711 A1* 12/2015 Sharma ............ H04N 21/25891
  725/34
2018/0063580 A1*  3/2018 Wittke ................ G06F 16/7867

OTHER PUBLICATIONS

OpenAI, "Better Language Models and Their Implications", https://openai.com/blog/better-language-models/, Mar. 17, 2020, 13 pages.
Guttag, Eric, "The Broken Patent-Eligibility Test of Alice and Mayo: Why We Urgently Need to Return to Principals of Diehr and Chakrabarty", IP Watchdog, Sep. 25, 2014, 7 pages.

* cited by examiner

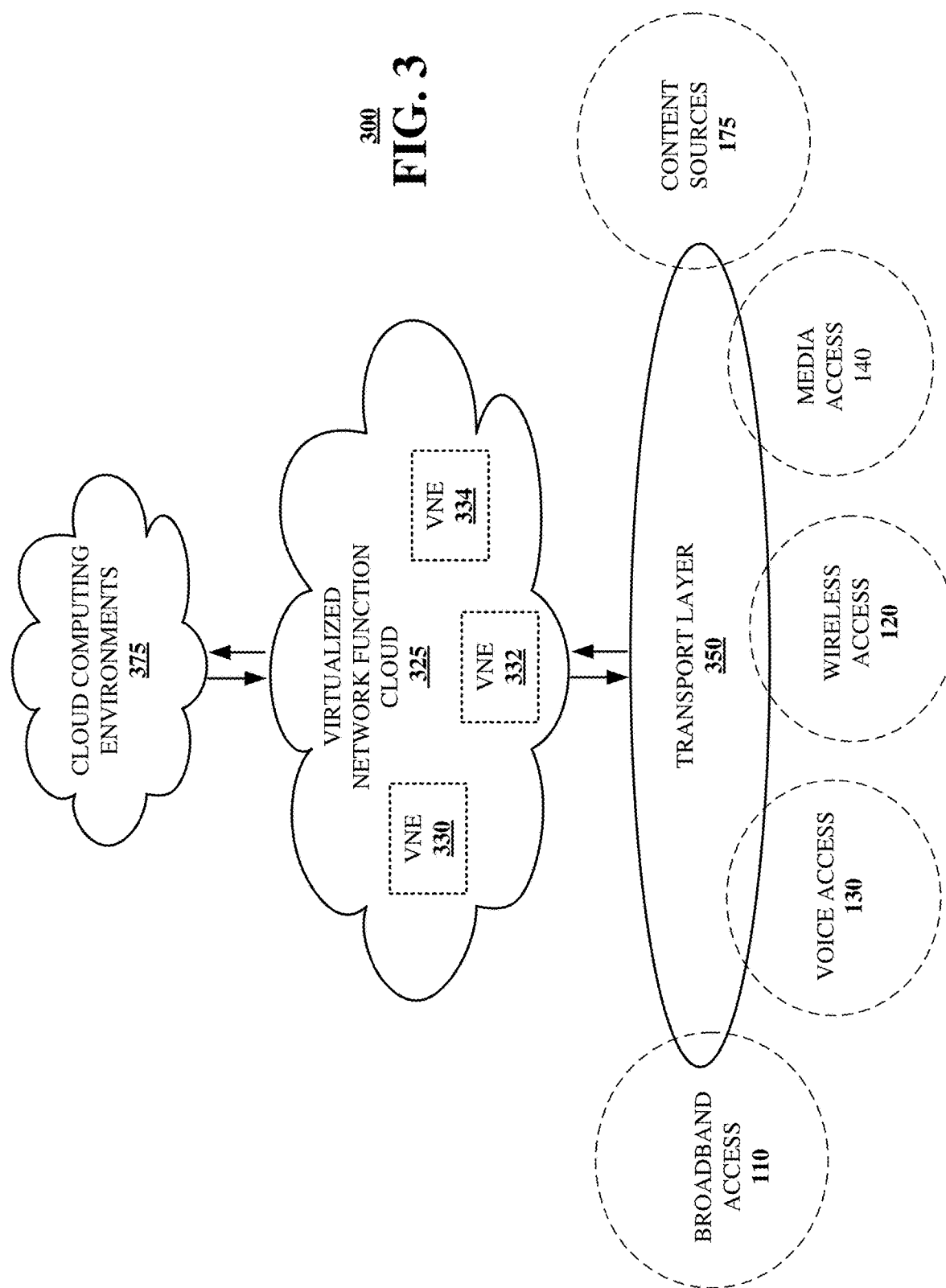

APPARATUSES AND METHODS FOR IDENTIFYING CONTENT DISTRIBUTION OPPORTUNITIES IN ACCORDANCE WITH ADVERTISING PERFORMANCE

FIELD OF THE DISCLOSURE

The subject disclosure relates to apparatuses and methods for identifying content distribution opportunities in accordance with advertising performance.

BACKGROUND

As the world becomes increasingly connected through vast communication networks and via various communication devices, additional opportunities are generated/created for targeting content (e.g., movies, programs, music, documents, etc.) to users. However, the increase in the number of connected users, as well as the increased availability of content items, poses challenges. For example, as content providers/distributors merge, there may be additional opportunities across the collective of content items to better position the content items. However, the techniques for detecting and reacting to trends in terms of user consumption of content items tend to be slow in terms of responsiveness and require a formulation of manual linkages between different content items. In contrast, advertising platforms seeking to fill advertising breaks/spots within a content item (where the breaks/spots are frequently referred to in the art as "inventory" within the content item) tend to act quickly/dynamically (e.g., on the order of milliseconds) and in response to a large number of user actions/observations.

BRIEF DESCRIPTION OF THE DRAWINGS

Reference will now be made to the accompanying drawings, which are not necessarily drawn to scale, and wherein:

FIG. 3 is a block diagram illustrating an example, non-limiting embodiment of a virtualized communication network in accordance with various aspects described herein.

DETAILED DESCRIPTION

The subject disclosure describes, among other things, illustrative embodiments for identifying content providers/outlets for distributing content items and creatives (e.g., advertisements). Other embodiments are described in the subject disclosure.

One or more aspects of the subject disclosure include distributing a first content item with a first plurality of advertisements via a first outlet, monitoring a performance of the first plurality of advertisements, determining, in accordance with the monitoring, that the performance of the first plurality of advertisements exceeds a threshold, identifying a second outlet to distribute the first content item responsive to the determining that the performance of the first plurality of advertisements exceeds the threshold, selecting a second plurality of advertisements in accordance with the identifying of the second outlet, wherein the second plurality of advertisements is at least partially differentiated from the first plurality of advertisements, and distributing the first content item with the second plurality of advertisements via the second outlet.

One or more aspects of the subject disclosure include distributing, to a first communication device, a first content item of a first content provider with a first advertisement, monitoring a performance of the first advertisement at the first communication device, determining, in accordance with the monitoring, that the performance of the first advertisement exceeds a threshold, identifying a second content provider to distribute the first content item responsive to the determining that the performance of the first advertisement exceeds the threshold, and distributing, via the second content provider, the first content item to the first communication device, a second communication device, or a combination thereof.

One or more aspects of the subject disclosure include monitoring a performance of a creative presented by a first plurality of client devices in conjunction with a distribution of a first content item via a first outlet, determining that the performance exceeds a threshold, responsive to the determining that the performance exceeds the threshold, identifying a second outlet to distribute the first content item, and providing the first content item to the second outlet responsive to the identifying of the second outlet.

Figure 1:
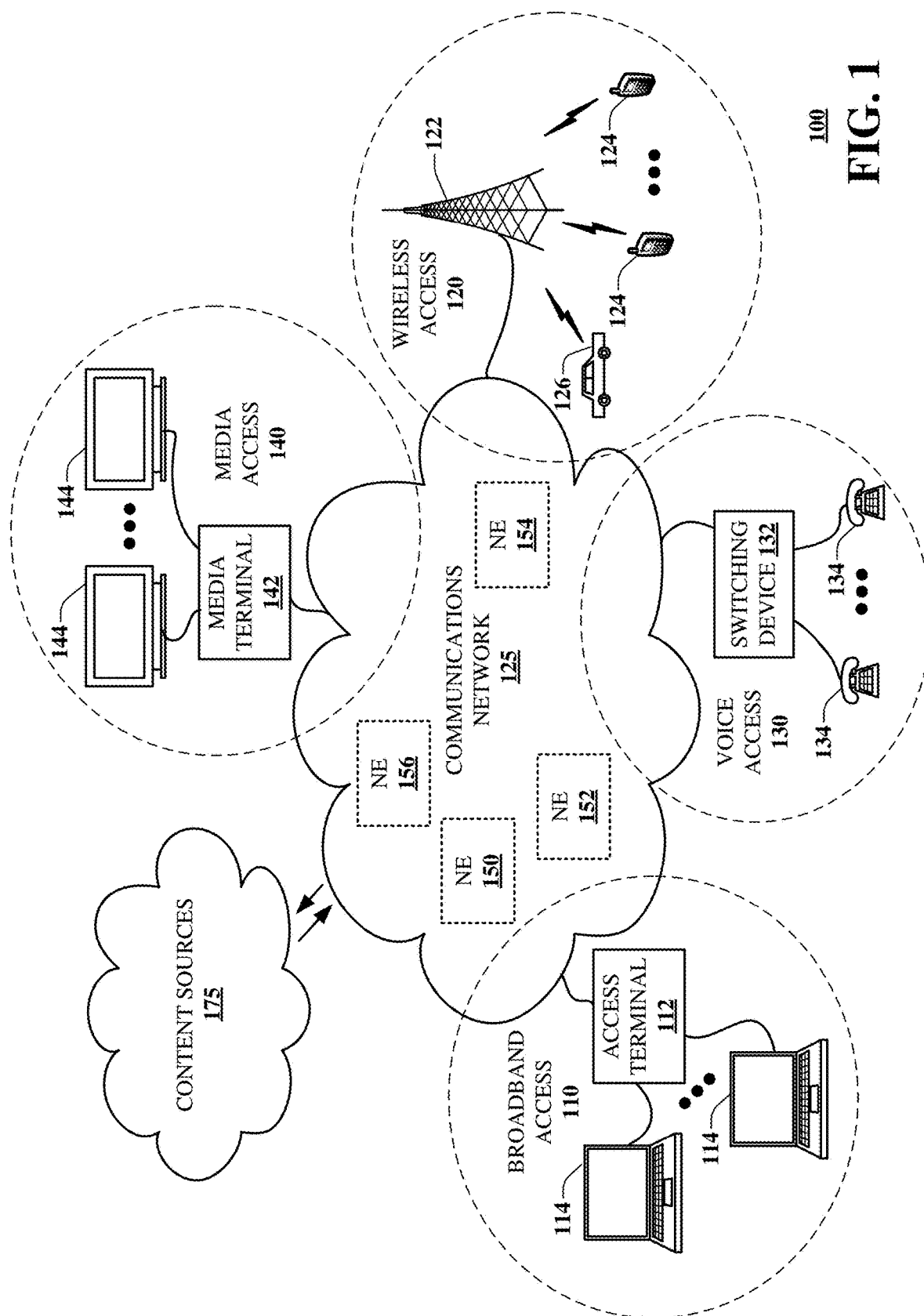
FIG. 1 is a block diagram illustrating an exemplary, non-limiting embodiment of a communications network in accordance with various aspects described herein.

Referring now to FIG. 1, a block diagram is shown illustrating an example, non-limiting embodiment of a system 100 in accordance with various aspects described herein. For example, system 100 can facilitate in whole or in part distributing a first content item with a first plurality of advertisements via a first outlet, monitoring a performance of the first plurality of advertisements, determining, in accordance with the monitoring, that the performance of the first plurality of advertisements exceeds a threshold, identifying a second outlet to distribute the first content item responsive to the determining that the performance of the first plurality of advertisements exceeds the threshold, selecting a second plurality of advertisements in accordance with the identifying of the second outlet, wherein the second plurality of advertisements is at least partially differentiated from the first plurality of advertisements, and distributing the first content item with the second plurality of advertisements via the second outlet. System 100 can facilitate in whole or in part distributing, to a first communication device, a first content item of a first content provider with a first advertisement, monitoring a performance of the first advertisement at the first communication device, determining, in accordance with the monitoring, that the performance of the first advertisement exceeds a threshold, identifying a second content provider to distribute the first content item responsive to the determining that the performance of the first advertisement exceeds the threshold, and distributing, via the second content provider, the first content item to the first communication device, a second communication device, or a combination thereof. System 100 can facilitate in whole or in part monitoring a performance of a creative presented by a first plurality of client devices in conjunction with a distribution of a first content item via a first outlet, determining that the performance exceeds a threshold, responsive to the determining that the performance exceeds the threshold, identifying a second outlet to distribute the first content item, and providing the first content item to the second outlet responsive to the identifying of the second outlet.

In particular, and as shown in FIG. 1, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

Figure 2A:
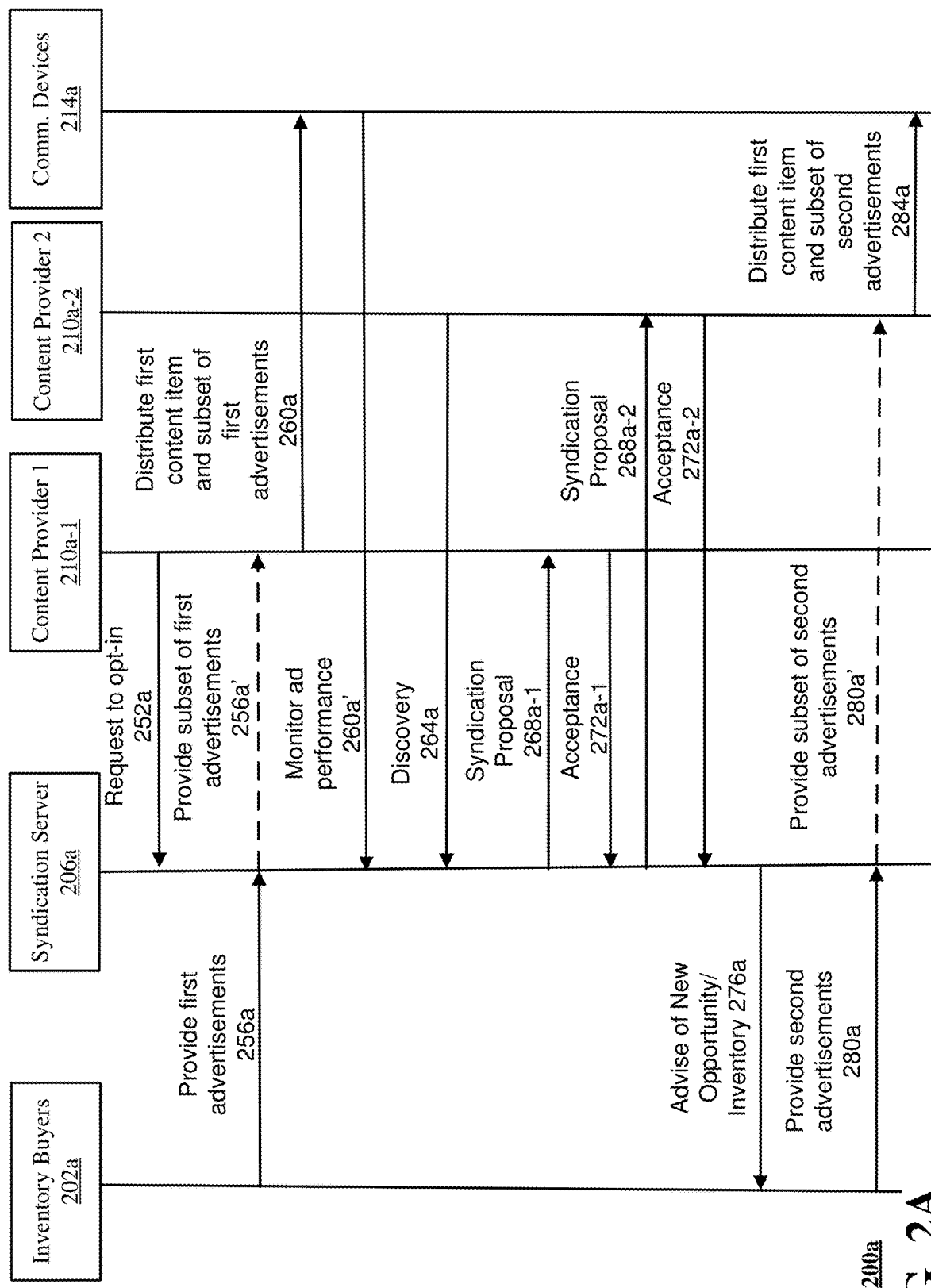
FIG. 2A is a block diagram illustrating an example, non-limiting embodiment of a system in accordance with various aspects described herein.

FIG. 2A is a block diagram illustrating an example, non-limiting embodiment of a system 200a functioning within, or operatively overlaid upon, the communication network 100 of FIG. 1 in accordance with various aspects described herein. The system 200a may include one or more inventory buyers 202a, one or more syndication servers 206a, a first content provider 210a-1, a second content provider 210a-2, and one or more communication devices 214a.

The inventory buyers 202a may supply creatives (e.g., advertisements associated with products or services) that may fulfill a portion of inventory (e.g., commercial or advertising breaks/spots) that is available within content items. The inventory buyers 202a may purchase the inventory (potentially in conjunction with one or more purchasing or bidding algorithms as would be known by one skilled in the art), thereby helping to defray/offset/reduce the cost/expense associated with creating and/or distributing/disseminating the content items. In some embodiments, the inventory buyers 202a may include one or more advertisers, advertising agencies, third party brokers, or any combination thereof.

The first content provider 210a-1 and the second content provider 210a-2 may be associated with one or more platforms, channels, websites, or the like. The content providers 210a-1 and 210a-2 may provide/allocate equipment (e.g., routers, switches, servers, etc.) that may be used to distribute/disseminate content items that are generated/created by content creators. In some embodiments, one or more content items may be generated/created by a content provider itself—e.g., a content provider may also be a content creator with respect to a content item that is distributed by the content provider.

The syndication server 206a may serve as an intermediary between the inventory buyers 202a and the content providers 210a-1 and 210a-2. In exemplary embodiments described in detail below, the first content provider 210a-1 may distribute a first content item to one or more of the communication devices 214a; subsequently, the first content item may be distributed by the second content provider 210a-2 to one or more of the communication devices 214a. The communication devices 214a may include user equipment and/or client devices, one or more routers, one or more switches, one or more modems, one or more gateways, etc., or any combination thereof.

In step 252a, the first content provider 210a-1 may request to opt-in to a syndication service provided by the system 200a (e.g., the syndication server 206a). For example, as part of step 252a the first content provider 210a-1 may enroll in the service, potentially in accordance with a payment of a subscription fee.

As part of the request of step 252a, the first content provider 210a-1 may provide/stipulate any limitations/conditions/restrictions on the potential reuse/redistribution of a first content item that is distributed/disseminated by the first content provider 210a-1. For example, if the first content item is adult-oriented content, the first content provider 210a-1 may indicate that the first content item is only to be shown between the hours of 10 PM and 4 AM as part of any potential redistribution. Similarly, the first content provider 210a-1 may stipulate that the first content item is not to be shown/distributed by any identified competitors of the first content provider 210a-1, such as for example a third content provider not shown in FIG. 2A.

In step 256a, the inventory buyers 202a may provide (e.g., transmit) creatives to the syndication server 206a. For example, the inventory buyers 202a may provide a first set of advertisements to the syndication server 206a as part of step 256a.

In step 256a', the syndication server 206a may provide a subset of the first set of advertisements of step 256a to the first content provider 210a-1. For example, the syndication server 206a (or another device, such as a different server) may execute one or more algorithms to select/map advertisements to content providers. Thus, in this example, the syndication server 206a may select the subset of the first set of advertisements for the first content provide 210a-1. In response to receiving the subset of the first set of advertisements as part of step 256a', the first content provider 210a-1 may incorporate the subset of the first set of advertisements as part of inventory associated with the first content item.

In step 260a, the first content provider 210a-1 may distribute/disseminate the combination of the first content item and the subset of the first set of advertisements to one or more of the communication devices 214a. The distribution of that combination in step 260a may be based on a push model, whereby the distribution occurs without an affirmative request by a communication device 214a for, e.g., the first content item. In some embodiments, the distribution of the combination in step 260a may be based on a pull model, such as for example in accordance with a request from a communication device 214a. Such a request may be based on a selection of, e.g., the first content item from: an electronic programming guide (EPG) or interactive programming guide (IPG), a menu, search results generated in response to a search query, etc.

In step 260a', the syndication server 206a may monitor performance associated with the subset of the first set of advertisements. For example, the performance may be monitored in accordance with one or more reports or metrics that may measure user consumption or engagement with respect to the subset of the first set of advertisements. To demonstrate, user consumption or engagement may entail the use of gaze tracking technology (e.g., to determine whether a user has paid attention to an advertisement), a user response to a survey/questionnaire pertaining to an advertisement, clicks or other selections pertaining to an advertisement, navigation to a site (e.g., a website) associated with an advertisement, placement of a product or a service associated with an advertisement into a virtual shopping cart, completion of a purchase of a product or a service associated with an advertisement, etc.

In step 264a, the syndication server 206a may discover the second content provider 210a-2. In some embodiments, the syndication server 206a may learn of the second content provider 210a-2 from the first content provider 210a-1 as part of step 264a. In some embodiments, the syndication server 206a may receive a request from the second content provider 210a-2 to enroll in the service provided by the system 200a (e.g., provided by the syndication server 206a) in step 264a, similar to step 252a described above. In some embodiments, step 264a may entail the syndication server 206a examining network traffic to identify the second content provider 210a-2 as a content provider.

The syndication server 206a may identify the second content provider 210a-2 as a potential candidate for redistributing the first content item. For example, the syndication server 206a may identify the second content provider 210a-2 as a potential candidate based on the monitored performance of step 260a. In response to that identification of the second content provider 210a-2, the syndication server 206a may provide (e.g., transmit) a syndication proposal/offer to the first content provider 210a-1 in step 268a-1, and may provide a syndication proposal/offer to the second content provider 210a-2 in step 268a-2.

The proposals of steps 268a-1 and 268a-2 may include terms and/or conditions. For example, the proposal of step 268a-1 may include terms of compensation or payment that may be made to the first content provider 210a-1 for allowing the second content provider 210a-2 to distribute the first content item. In some embodiments, the proposal of step 268a-1 may include an identification/identifier of the second content provider 210a-2. The proposal of step 268a-2 may include terms of payment that the second content provider 210a-2 may need to agree to/provide in order to receive/obtain authorization/permission to distribute the first content item.

In some instances, the amount paid by the second content provider 210a-2 may be different from (e.g., may be more than) the amount paid to the first content provider 210a-1. For example, an operator/provider of the system 200a (e.g., the syndication server 206a) may receive a portion (e.g., a percentage) of the amount paid by the second content provider 210a-2 to facilitate the (syndication) service provided via the system 200a.

In step 272a-1, the first content provider 210a-1 may agree to/accept the proposal of step 268a-1. Similarly, in step 272a-2, the second content provider 210a-2 may agree to/accept the proposal of step 268a-2.

In step 276a, and based upon or responsive to obtaining the acceptances of the proposals in connection with steps 27a-1 and 272a-2, the syndication server 206a may advise/inform the inventory buyers 202a of a new opportunity/inventory that may be available via a distribution of the first content item via the second content provider 210a-2. For example, as part of step 276a the syndication server 206a may solicit bids from the inventory buyers 202a on behalf of the second content provider 210a-2. The solicitation may include: an identifier of the first content provider 210a-1, an identifier of the first content item, an identifier of the second content provider 210a-2, or any combination thereof.

In step 280a, the inventory buyers 202a may provide a second set of advertisements to the syndication server 206a. As part of step 280a, and to the extent that step 276a includes a solicitation of bids, the inventory buyers 202a may provide bids as part of step 280a.

In step 280a', the syndication server 206a may select and provide a subset of the second set of advertisements to the second content provider 210a-2. The selection of step 280a' may be based on bids that may be included as part of step 280a.

In response to receiving the subset of the second set of advertisements as part of step 280a', the second content provider 210a-2 may incorporate the subset of the second set of advertisements as part of inventory associated with the first content item.

In step 284a, the second content provider 210a-2 may distribute/disseminate the (combination of the) first content item and the subset of the second set of advertisements to one or more of the communication devices 214a. The distribution of step 284a may adhere to a push model and/or a pull model (see the discussion above, in relation to step 260a, regarding the use of push and pull models).

Figure 2B:
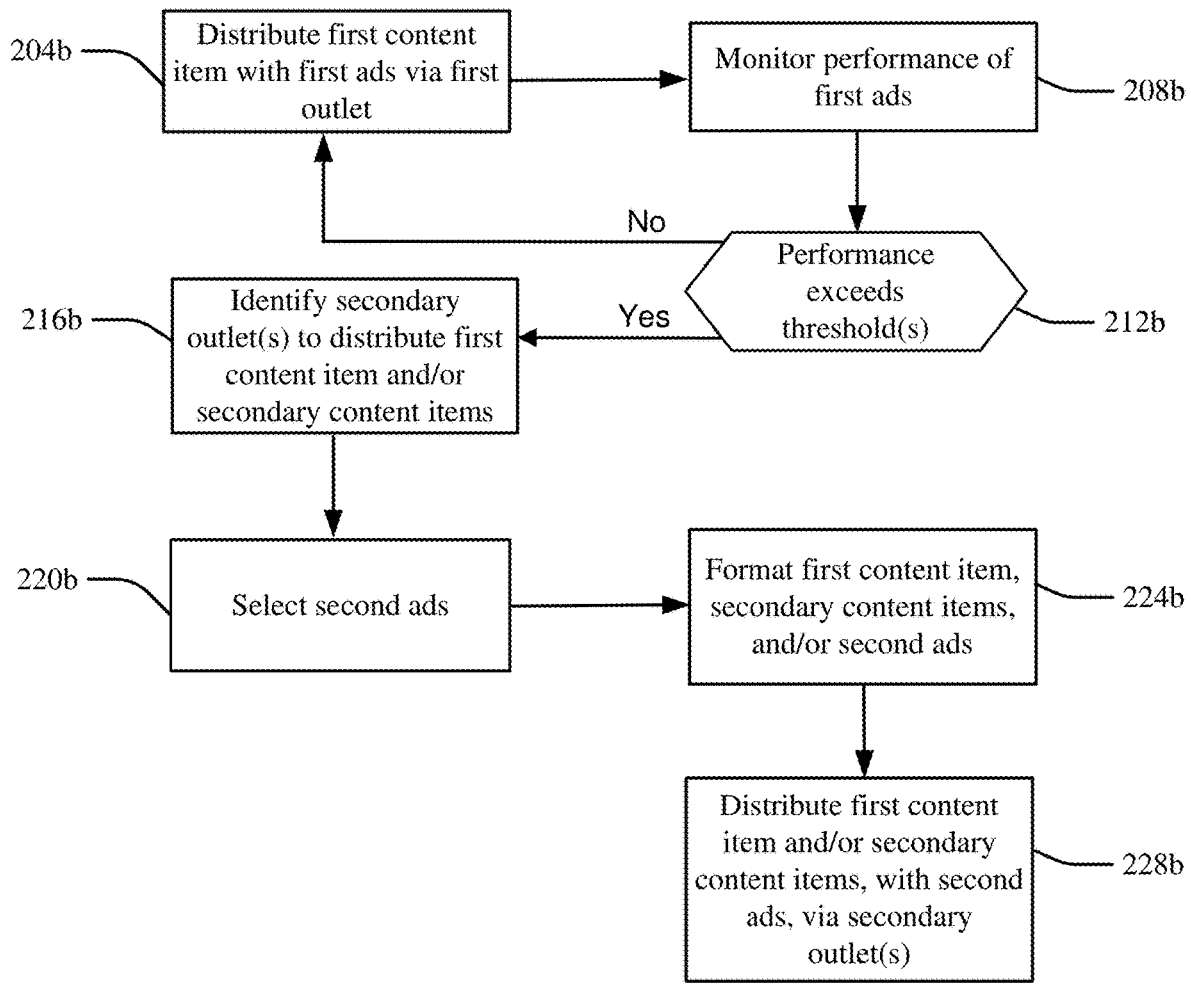
FIG. 2B depicts an illustrative embodiment of a method in accordance with various aspects described herein.

Referring now to FIG. 2B, an illustrative embodiment of a method 200b in accordance with various aspects described herein is shown. The method 200b may be partially or wholly executed by one or more systems, apparatuses, devices, and/or components, such as for example the systems, apparatuses, devices, and components described herein. In some embodiments, one or more of the blocks/operations of the method 200b (or one or more portions thereof) may be implemented/executed in conjunction with one or more of the steps (or one or more portions thereof) described above in connection with the system 200a.

In block 204b, a first content item may be distributed with first advertisements (ads) via a first outlet. The first outlet may correspond to, or be associated with, a first content provider. The first outlet may utilize a first set of resources (e.g., a first set of network resources).

In block 208b, a performance of the first ads may be monitored. For example, as part of block 208b, user consumption and/or engagement with respect to the first ads may be monitored/detected.

In block 212b, a determination may be made whether the performance of the first ads exceeds one or more thresholds in accordance with the monitoring of block 208b. The thresholds may be selected to avoid unnecessarily/excessively triggering syndication decisions (e.g., an addition or removal of a content item with respect to a distribution outlet). The thresholds may be predetermined, may be static in nature, and/or may be dynamic in nature. In some embodiments, the thresholds may be modified or adapted in response to: a user-generated input, a change in conditions, an occurrence of an event, etc. The thresholds may be based on one or more rules that may be learned/established based on identifications of types of ads that are placed on/with certain inventory. The thresholds may be based on budgets and/or an evaluation of benefits associated with syndication. One or more predictive algorithms may be utilized to determine potential or actual benefits of syndication.

If the determination of block 212b indicates that the performance does not exceed the threshold(s), flow may proceed from block 212b to block 204b. As part of the flow from block 212b to block 204b, the first ads of block 204b may be replaced/substituted with another set of ads (hereinafter referred to as first ads*). The first ads* may be the same as the first ads, or the first ads* may be at least partially differentiated from the first ads. The flow from block 212b to block 204b may establish a loop, whereby the first content item may continue to be distributed via the first outlet. If the determination of block 212b indicates that the performance exceeds the threshold(s), flow may proceed from block 212b to block 216b.

In block 216b, one or more secondary outlets may be identified to distribute the first content item and/or one or more secondary content items. The secondary outlets may correspond to, or be associated with, one or more secondary content providers.

To the extent that a secondary content item is included as part of block 216b, the secondary content item may be related to the first the first content item. For example, if the first content item is a first episode of a television program, the secondary content item may be a second episode of the television program. A secondary content item may share one or more characteristics in common with the first content item. For example, the secondary content item: may be included in a same genre/category (e.g., comedy, classical music, news reporting, etc.) as the first content item, may include a same character, actor/actress, musician, or narrator as the first content item, may be produced by a common content creator (e.g., a common studio or production team) as the first content item, etc.

In block 220b, second ads may be selected to accompany a distribution of the first content item and/or the secondary content items of block 216b via the secondary outlets identified in block 216b. The second ads may be at least partially differentiated from the first ads and/or the first ads* described above in relation to blocks 204b and 212b. The second ads may be selected in accordance with one or more bids, where the bids may, in turn, be based on perceived/expected demand for the first content item and/or the secondary content items via the secondary outlet(s).

In block 224b, the first content item (see block 204b), the secondary content items (see block 216b), and/or the second ads (see block 220b) may be formatted. The formatting of block 224b may adhere/conform to one or more requirements or specifications associated with the secondary outlet(s). The formatting of block 224b may adhere/conform to one or more requirements or specifications (e.g., a capability) associated with a communication device that is an intended recipient of the first content item, the secondary content items, and/or the second ads.

In block 228b, the first content item and/or the secondary content items, with the second ads, may be distributed via the secondary outlet(s). The distribution of block 228b may incorporate the formatting of block 224b.

While for purposes of simplicity of explanation, the respective processes are shown and described as a series of blocks in FIG. 2B, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Aspects of this disclosure are directed to systems, apparatuses, devices, components, and methods for identifying opportunities to distribute content/content items. For example, aspects of this disclosure may generate recommendations regarding syndication opportunities between different content providers. Such syndication opportunities may be based on real-time, or near-real-time (e.g., on the order of ten seconds, between five and twenty seconds, etc.), observations of inventory or advertising-buy performance. Aspects of the disclosure may enhance the efficiency of existing content items by facilitating a reallocation or reuse of such content items in accordance with a near-optimum (or optimum) distribution mechanism. In this manner, and given finite resources (e.g., a finite budget), content distributors may make effective use of such resources.

Aspects of the disclosure may provide for a real-time, or near-real-time, analysis of advertising-buy performances, potentially across one or more distribution resources (e.g., one or more channels). Such an analysis may serve to identify opportunities for distributing one or more content items via the one or more distribution resources. In this regard, the rate/speed at which such opportunities are identified may be enhanced relative to the use of conventional technologies/techniques.

Aspects of the disclosure may alter a format associated with a distribution, presentation, or rendering of a content item. For example, recommendations/suggestions may be generated regarding how to modify source content for enhanced (e.g., best) performance among a variety of outlets or platforms (e.g., mobile, desktop, etc.). Aspects of formatting may facilitate use of newer technologies (e.g., automated speech recognition (ASR), text-to-speech (TTS), etc.) to transfer content items, or other assets, between platforms. In some embodiments, formatting may include enhancing a resolution associated with a content item (e.g., music, a video, etc.). In some embodiments, an amount/degree/extent of enhancement may be a function of network traffic. For example, during periods of high network traffic/congestion, a lesser amount of enhancement may be applied relative to periods of light/little network traffic/congestion in order to preserve network resources. In some embodiments, an amount/degree/extent of enhancement may be selected to satisfy quality of service (QoS) and/or quality of experience (QoE) requirements/parameters.

In some embodiments, multiple versions of a content item and/or an advertisement may be generated to support each of the platforms. In some embodiments, a given type/version may be generated "on-the-fly", such as for example in response to a request for a content item from a user or a user equipment/client device. In some embodiments, the user and/or the user equipment may provide parameters (e.g., preferences) regarding the content item, and the generation of the particular version of the content item may adhere to such parameters. In this manner, users/user equipment may be able to tailor/customize a content item to particular requirements or specifications.

Aspects of the disclosure may facilitate a generation of predictions regarding content items and/or advertisements in respect of changing conditions, the passage of time, and other factors. In some embodiments, such predictions may adhere to factors/parameters associated with a market-driven approach, where such factors/parameters may include demographic characteristics, cultures, geographical locations, time zones, etc. In some embodiments, the factors/parameters associated with the predictions may be incorporated in, or as part of, metadata that may be analyzed by one or more processing systems or processors.

In some embodiments, one or more advertising servers (e.g., an ad-sell server) may also function as one or more syndication servers that identify opportunities for repurposing or redistributing a content item from a first/primary outlet to one or more additional outlets. In some embodiments, the identification of such opportunities may be based on advertising performance (which, in turn, may be based on an analysis of one or more metrics associated with advertisement distribution, advertisement presentation, and/or advertisement consumption). In some embodiments, the advertising server(s) may serve as a broker or intermediary between the outlets. In some embodiments, the advertising server(s) may reformat the content item from a first format/version to one or more additional formats/versions to facilitate, e.g., distribution or presentation via the one or more additional outlets.

Aspects of the disclosure may enhance the accuracy associated with a valuation of a content item in accordance with responses or metrics associated with advertisements (relative to the use of conventional technologies/techniques). Furthermore, such an enhancement/increase in accuracy may be accompanied by an increase in a rate or speed at which the valuation is generated (relative to the use of conventional technologies/techniques).

Aspects of the disclosure may serve to notify a content provider (e.g., a content creator, a content distributor, etc.) of opportunities that might otherwise have been overlooked by the content provider. For example, aspects of the disclosure may notify a first content provider of an opportunity associated with a secondary (e.g., a peer) content provider to distribute/disseminate content items of the first content provider.

Aspects of the disclosure may generate additional opportunities (e.g., profit or revenue opportunities) for content providers by identifying additional or supplemental outlets for content items. Still further, aspects of the disclosure may facilitate additional opportunities for advertising platforms (e.g., advertising buyers and sellers) in respect of inventory available in content items. For example, aspects of the disclosure may enable a buyer of advertising inventory to discover particular inventory that may be available in a content item, where that buyer otherwise might not be aware of such particular inventory.

As described herein, aspects of this disclosure may provide for a unified methodology to recommend and syndicate content/content items across multiple outlets, platforms, and the like. In some embodiments, content may be distributed/disseminated in accordance with one or more distribution models. In some embodiments, content items may be distributed via a broadcast distribution model (e.g., linear programming), a multicast distribution model (e.g., pay-per-view), and/or a unicast distribution model (e.g., on demand). A distribution of content/content items may adhere/conform to one or more communication protocols and/or one or more communication standards.

In some embodiments, if a first content item falls below, or fails to satisfy, a threshold in terms of a reuse/repurposing of the first content item via a secondary/alternative distribution outlet, a second content item may be selected for use in conjunction with the secondary distribution outlet. The second content item may be selected from a pool of candidate content items. In this manner, member content items of the pool may still receive/obtain the benefits of a "secondary life" via the secondary distribution outlet while at the same time avoiding diluting the value associated with the first content item. Stated slightly differently, and recognizing that distribution outlets are valuable resources (in terms of, e.g., transmission bandwidth, frequency channel utilization, etc.), content items may be allocated to distribution outlets in accordance with their respective values/valuations.

In some embodiments, and from the perspective of a content provider, rules may be generated/created to determine when to sell, assign, or license a given content item (and under what terms) to a given distribution outlet/platform. In this regard, the generation of such rules may be incorporated as part of one or more machine learning (ML) algorithms, whereby the algorithms may achieve increased resolution/accuracy over time as the algorithms are implemented/practiced. Stated slightly differently, any error/inaccuracy in the algorithms may tend to converge towards zero over time, as the algorithms are executed/used.

In some embodiments, behavioral analytics (e.g., locations, activities, communication sessions, schedules, etc.) may be included as part of a methodology to identify and evaluate the potential for a content item in terms of a distribution outlet or destination. The use of such behavioral analytics may represent an enhancement over non-real-time observations that may be made by a content provider.

Aspects of the disclosure may provide for a federation of content providers, content creators, and the like, in order to maintain a balanced/equitable marketplace/exchange in respect of content items. In this manner, parties to the marketplace/exchange may obtain/receive fair compensation, e.g., compensation in proportion to their respective contributions.

In some embodiments, content sharing or distribution may conform to or utilize a distributed ledger, such as for example in relation to blockchain technology. The use of a distributed ledger may facilitate an authentication of transactions and/or may enhance fraud prevention and detection capabilities.

Aspects of the disclosure may adapt in response to changes in conditions (e.g., supply or demand) with respect to one or more content items. For example, if a first content item experiences a surge in popularity in conjunction with a first outlet/channel/platform (where such a surge may be manifested in relation to user consumption of, or interaction with, advertisements presented as part of the first outlet/channel/platform), the first content item may be allocated to additional outlets/channels/platforms to meet the demand for the first content item. Conversely, if the first content item experiences a decline in popularity in conjunction with the first outlet/channel/platform (where such a decline may be manifested in relation to user consumption of, or interaction with, advertisements presented as part of the first outlet/channel/platform), an amount or extent to which the first content item appears on additional outlets/channels/platforms may be reduced (or even completely eliminated in some instances).

In accordance with embodiments of this disclosure, advertising performance (which may be included as part of one or more reports, metrics, etc.) may dictate whether, and to what extent, a content item is distributed via a particular outlet, channel, platform, or the like. Information/data that is obtained in accordance with a monitoring of such advertising performance may be analyzed to make decisions/determinations regarding content item allocations.

Aspects of the disclosure may adhere to principles of contracts/contract law in one or more jurisdictions. For example, agreements regarding syndication and/or placement of advertisements in connection with content items may incorporate aspects of offer and acceptance as between operators of outlets, rights of first refusal, warranties and waivers, etc. Still further, in some embodiments, decisions/determinations may be made in accordance with principles of economics, such as supply and demand, elasticity, micro and macro level perspectives/analyses, etc.

As described herein, aspects of the disclosure may facilitate a selection of advertisements in conjunction with a distribution of content items. The selection may be based at least in part on a location of a user and/or a communication device associated with the user, a user profile of the user, identifications of one or more communication sessions engaged in by the user and/or the communication device, demographic characteristics, etc.

Aspects of this disclosure may facilitate obtaining and distribution creatives (e.g., advertisements) in accordance with one or more negotiation or bidding models or techniques. In some embodiments, creatives may be obtained from one or more providers in accordance with one or more bids obtained from the providers. A creative may be formatted in accordance with an identified outlet and/or a communication device that obtains the creative.

Referring now to FIG. 3, a block diagram 300 is shown illustrating an example, non-limiting embodiment of a virtualized communication network in accordance with various aspects described herein. In particular a virtualized communication network is presented that can be used to implement some or all of the subsystems and functions of system 100, the subsystems and functions of system 200a, and method 200b presented in FIGS. 1, 2A, and 2B. For example, virtualized communication network 300 can facilitate in whole or in part distributing a first content item with a first plurality of advertisements via a first outlet, monitoring a performance of the first plurality of advertisements, determining, in accordance with the monitoring, that the performance of the first plurality of advertisements exceeds a threshold, identifying a second outlet to distribute the first content item responsive to the determining that the performance of the first plurality of advertisements exceeds the threshold, selecting a second plurality of advertisements in accordance with the identifying of the second outlet, wherein the second plurality of advertisements is at least partially differentiated from the first plurality of advertisements, and distributing the first content item with the second plurality of advertisements via the second outlet. Virtualized communication network 300 can facilitate in whole or in part distributing, to a first communication device, a first content item of a first content provider with a first advertisement, monitoring a performance of the first advertisement at the first communication device, determining, in accordance with the monitoring, that the performance of the first advertisement exceeds a threshold, identifying a second content provider to distribute the first content item responsive to the determining that the performance of the first advertisement exceeds the threshold, and distributing, via the second content provider, the first content item to the first communication device, a second communication device, or a combination thereof. Virtualized communication network 300 can facilitate in whole or in part monitoring a performance of a creative presented by a first plurality of client devices in conjunction with a distribution of a first content item via a first outlet, determining that the performance exceeds a threshold, responsive to the determining that the performance exceeds the threshold, identifying a second outlet to distribute the first content item, and providing the first content item to the second outlet responsive to the identifying of the second outlet.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general purpose processors or general purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it's elastic: so the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized, and might require special DSP code and analog front-ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements don't typically need to forward large amounts of traffic, their workload can be distributed across a number of servers—each of which adds a portion of the capability, and overall which creates an elastic function with higher availability than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud, or might simply orchestrate workloads supported entirely in NFV infrastructure from these third party locations.

Figure 4:
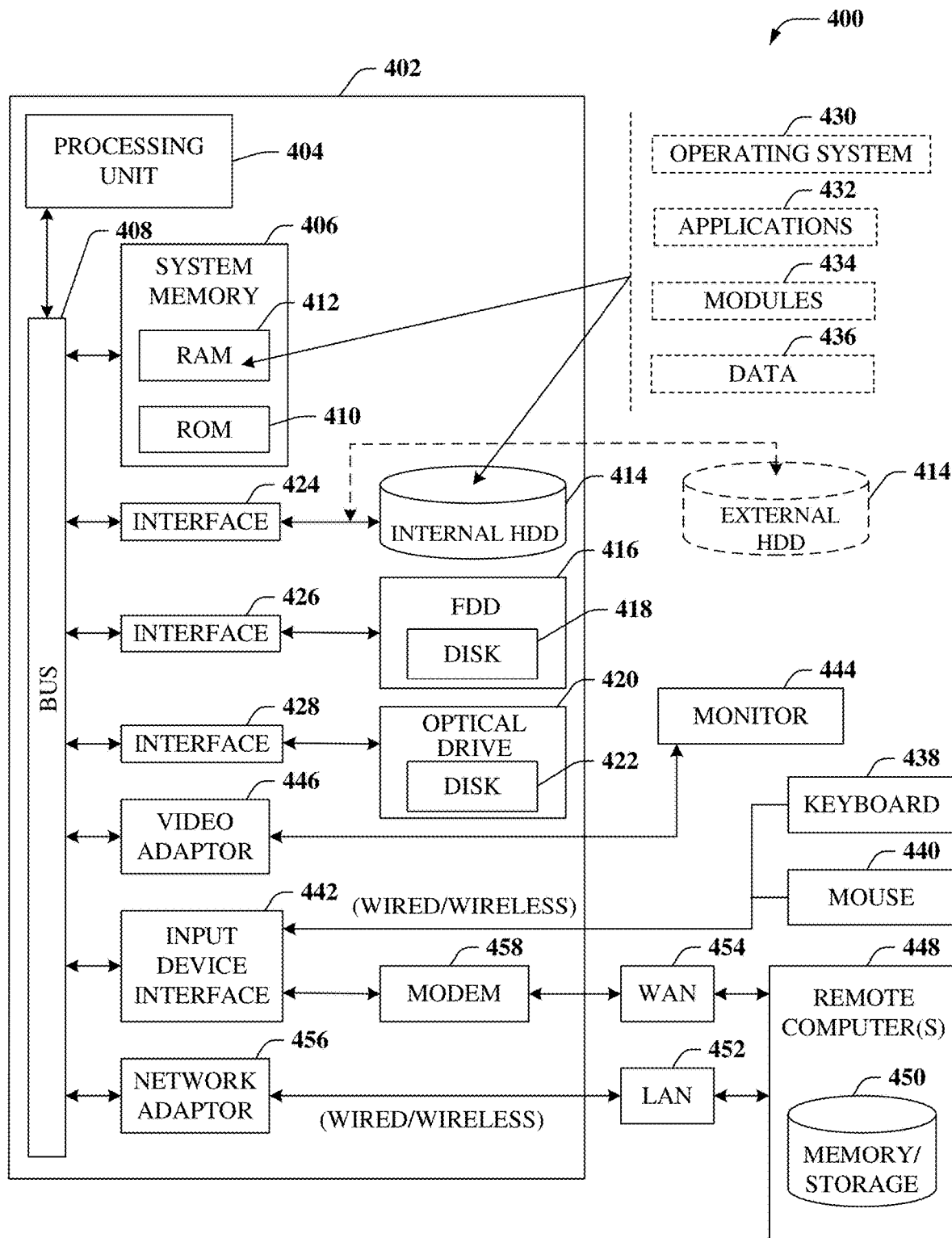
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate in whole or in part distributing a first content item with a first plurality of advertisements via a first outlet, monitoring a performance of the first plurality of advertisements, determining, in accordance with the monitoring, that the performance of the first plurality of advertisements exceeds a threshold, identifying a second outlet to distribute the first content item responsive to the determining that the performance of the first plurality of advertisements exceeds the threshold, selecting a second plurality of advertisements in accordance with the identifying of the second outlet, wherein the second plurality of advertisements is at least partially differentiated from the first plurality of advertisements, and distributing the first content item with the second plurality of advertisements via the second outlet. Computing environment 400 can facilitate in whole or in part distributing, to a first communication device, a first content item of a first content provider with a first advertisement, monitoring a performance of the first advertisement at the first communication device, determining, in accordance with the monitoring, that the performance of the first advertisement exceeds a threshold, identifying a second content provider to distribute the first content item responsive to the determining that the performance of the first advertisement exceeds the threshold, and distributing, via the second content provider, the first content item to the first communication device, a second communication device, or a combination thereof. Computing environment 400 can facilitate in whole or in part monitoring a performance of a creative presented by a first plurality of client devices in conjunction with a distribution of a first content item via a first outlet, determining that the performance exceeds a threshold, responsive to the determining that the performance exceeds the threshold, identifying a second outlet to distribute the first content item, and providing the first content item to the second outlet responsive to the identifying of the second outlet.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
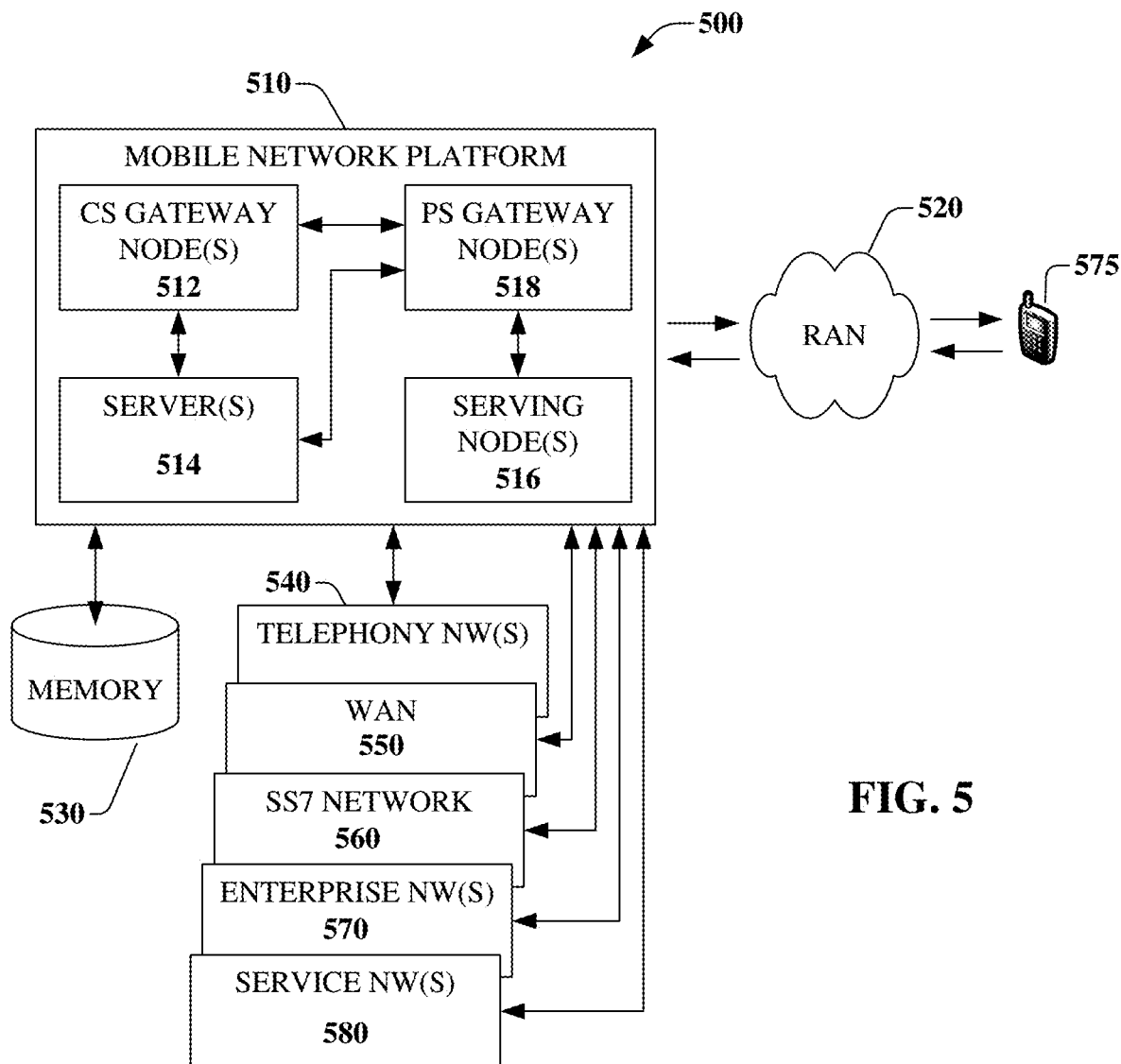
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate in whole or in part distributing a first content item with a first plurality of advertisements via a first outlet, monitoring a performance of the first plurality of advertisements, determining, in accordance with the monitoring, that the performance of the first plurality of advertisements exceeds a threshold, identifying a second outlet to distribute the first content item responsive to the determining that the performance of the first plurality of advertisements exceeds the threshold, selecting a second plurality of advertisements in accordance with the identifying of the second outlet, wherein the second plurality of advertisements is at least partially differentiated from the first plurality of advertisements, and distributing the first content item with the second plurality of advertisements via the second outlet. Platform 510 can facilitate in whole or in part distributing, to a first communication device, a first content item of a first content provider with a first advertisement, monitoring a performance of the first advertisement at the first communication device, determining, in accordance with the monitoring, that the performance of the first advertisement exceeds a threshold, identifying a second content provider to distribute the first content item responsive to the determining that the performance of the first advertisement exceeds the threshold, and distributing, via the second content provider, the first content item to the first communication device, a second communication device, or a combination thereof. Platform 510 can facilitate in whole or in part monitoring a performance of a creative presented by a first plurality of client devices in conjunction with a distribution of a first content item via a first outlet, determining that the performance exceeds a threshold, responsive to the determining that the performance exceeds the threshold, identifying a second outlet to distribute the first content item, and providing the first content item to the second outlet responsive to the identifying of the second outlet.

In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks, and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology(ies) utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1(s) that enhance wireless service coverage by providing more network coverage.

It is to be noted that server(s) 514 can comprise one or more processors configured to confer at least in part the functionality of mobile network platform 510. To that end, the one or more processor can execute code instructions stored in memory 530, for example. It is should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
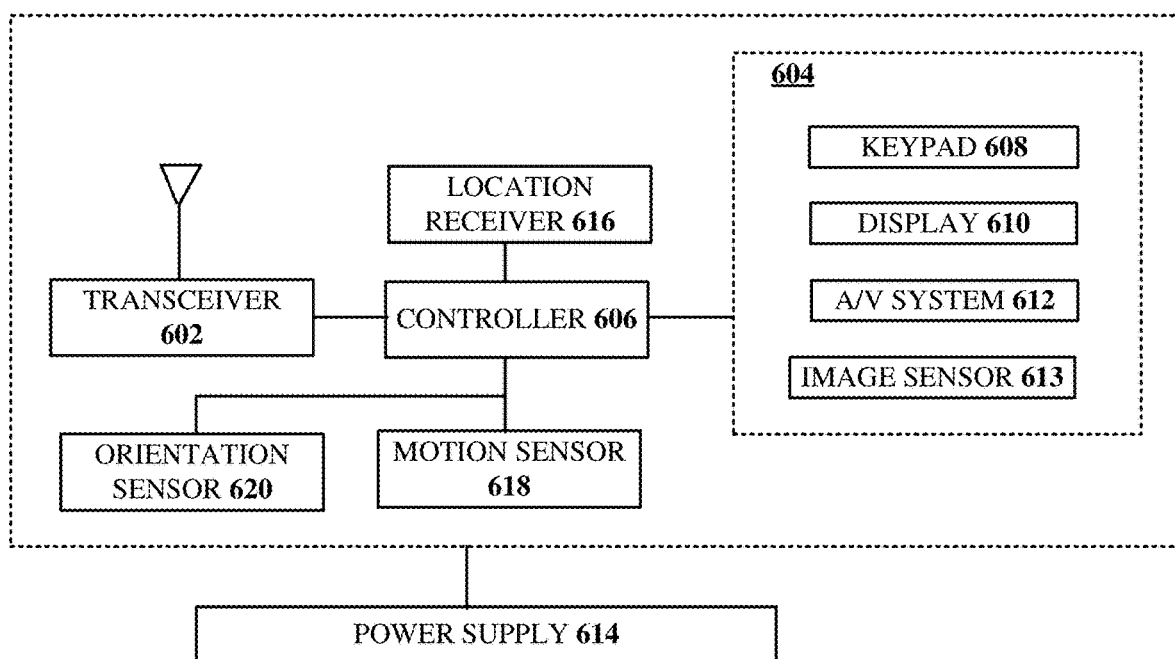
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, computing device 600 can facilitate in whole or in part distributing a first content item with a first plurality of advertisements via a first outlet, monitoring a performance of the first plurality of advertisements, determining, in accordance with the monitoring, that the performance of the first plurality of advertisements exceeds a threshold, identifying a second outlet to distribute the first content item responsive to the determining that the performance of the first plurality of advertisements exceeds the threshold, selecting a second plurality of advertisements in accordance with the identifying of the second outlet, wherein the second plurality of advertisements is at least partially differentiated from the first plurality of advertisements, and distributing the first content item with the second plurality of advertisements via the second outlet. Computing device 600 can facilitate in whole or in part distributing, to a first communication device, a first content item of a first content provider with a first advertisement, monitoring a performance of the first advertisement at the first communication device, determining, in accordance with the monitoring, that the performance of the first advertisement exceeds a threshold, identifying a second content provider to distribute the first content item responsive to the determining that the performance of the first advertisement exceeds the threshold, and distributing, via the second content provider, the first content item to the first communication device, a second communication device, or a combination thereof. Computing device 600 can facilitate in whole or in part monitoring a performance of a creative presented by a first plurality of client devices in conjunction with a distribution of a first content item via a first outlet, determining that the performance exceeds a threshold, responsive to the determining that the performance exceeds the threshold, identifying a second outlet to distribute the first content item, and providing the first content item to the second outlet responsive to the identifying of the second outlet.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, nonvolatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, $x=(x1, x2, x3, x4, \ldots, xn)$, to a confidence that the input belongs to a class, that is, $f(x)$=confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A device, comprising:
a processing system including a processor; and
a memory that stores executable instructions that, when executed by the processing system, facilitate performance of operations, the operations comprising:
distributing a first content item with a first plurality of advertisements via a first outlet;
monitoring a performance of the first plurality of advertisements;
determining, in accordance with the monitoring, that the performance of the first plurality of advertisements exceeds a threshold;
identifying a second outlet to distribute the first content item based on an examination of network traffic and responsive to the determining that the performance of the first plurality of advertisements exceeds the threshold;
selecting a second plurality of advertisements in accordance with the identifying of the second outlet, wherein the second plurality of advertisements is at least partially differentiated from the first plurality of advertisements;
applying a first enhancement to the first content item when the network traffic is at a first level and a second enhancement to the first content item when the network traffic is at a second level that is different from the first level, the applying resulting in an enhanced first content item, wherein the second enhancement is different from the first enhancement, and wherein the applying of the first enhancement results in the enhanced first content item having a first resolution and the applying of the second enhancement results in the enhanced first content item having a second resolution;
distributing the enhanced first content item with the second plurality of advertisements via the second outlet;
identifying a second content item responsive to the determining that the performance of the first plurality of advertisements exceeds the threshold and based on a determination that the second content item shares at least one characteristic in common with the first content item; and
distributing the second content item via the second outlet,
wherein the determination that the second content item shares at least one characteristic in common with the first content item comprises:
a determination that the first content item is a first episode of a program and the second content item is a second episode of the program,
a determination that each of the first episode and the second episode includes a same character, and
a determination that each of the first episode and the second episode includes a same musician.

2. The device of claim 1, wherein the operations further comprise:
identifying a third outlet to distribute the first content item responsive to the determining that the performance of the first plurality of advertisements exceeds the threshold;
selecting a third plurality of advertisements in accordance with the identifying of the third outlet, wherein the third plurality of advertisements is at least partially differentiated from the first plurality of advertisements, and wherein the third plurality of advertisements is at least partially differentiated from the second plurality of advertisements; and
distributing the first content item with the third plurality of advertisements via the third outlet.

3. The device of claim 1, wherein the operations further comprise:
formatting the enhanced first content item in accordance with an identification of a client device that receives the enhanced first content item via the second outlet, resulting in a formatted first content item,
wherein the distributing of the enhanced first content item with the second plurality of advertisements via the second outlet comprises distributing the formatted first content item.

4. The device of claim 1, wherein the operations further comprise:
receiving a first plurality of bids from a plurality of inventory buyers,
wherein the selecting of the second plurality of advertisements is further in accordance with the first plurality of bids.

5. The device of claim 4, wherein the operations further comprise:
transmitting a solicitation for the first plurality of bids to the plurality of inventory buyers, wherein the solicitation identifies: the first outlet, the first content item, the second outlet, or any combination thereof, and wherein the receiving of the first plurality of bids is responsive to the transmitting of the solicitation.

6. The device of claim 1, wherein the first content item comprises audio content, video content, and text.

7. The device of claim 1, wherein the operations further comprise:
compensating a first operator of the first outlet with a first level of compensation; and
charging a second operator of the second outlet a second level of compensation that is greater than the first level of compensation.

8. The device of claim 1, wherein the operations further comprise:
transmitting, to a first operator of the first outlet, an offer for a second operator to distribute the first content item via the second outlet, wherein the offer identifies the second operator, the second outlet, or a combination thereof; and
receiving, from the first operator of the first outlet, an acceptance of the offer,
wherein the distributing of the enhanced first content item with the second plurality of advertisements via the second outlet is responsive to the receiving of the acceptance of the offer.

9. The device of claim 1, wherein the selecting of the second plurality of advertisements is further in accordance with a location of a communication device that receives the enhanced first content item via the second outlet, a user profile associated with a user of the communication device, and an identification of a communication session engaged in by the communication device.

10. The device of claim 1, wherein the monitoring of the performance of the first plurality of advertisements comprises: monitoring a user in accordance with gaze tracking technology, obtaining a user response to a survey pertaining to an advertisement included in the first plurality of advertisements, obtaining an indication of a selection of the advertisement, obtaining an indication of a navigation to a site associated with the advertisement, a placement of a product or a service associated with the advertisement into a virtual shopping cart, a completion of a purchase of the product or the service, or any combination thereof.

11. A non-transitory machine-readable medium, comprising executable instructions that, when executed by a processing system including a processor, facilitate performance of operations, the operations comprising:
distributing, to a first communication device, a first content item of a first content provider with a first advertisement;
monitoring a performance of the first advertisement at the first communication device;
determining, in accordance with the monitoring, that the performance of the first advertisement exceeds a threshold;
identifying a second content provider to distribute the first content item based on an examination of network traffic and responsive to the determining that the performance of the first advertisement exceeds the threshold;
applying a first enhancement to the first content item when the network traffic is at a first level and a second enhancement to the first content item when the network traffic is at a second level that is different from the first level, the applying resulting in an enhanced first content item, wherein the second enhancement is different from the first enhancement, and wherein the applying of the first enhancement results in the enhanced first content item having a first resolution and the applying of the second enhancement results in the enhanced first content item having a second resolution;
distributing, via the second content provider, the enhanced first content item to the first communication device, a second communication device, or a combination thereof;
identifying a second content item responsive to the determining that the performance of the first advertisement exceeds the threshold and based on a determination that the second content item shares at least one characteristic in common with the first content item; and
distributing, via the second content provider, the second content item to the first communication device, the second communication device, or the combination thereof,
wherein the determination that the second content item shares at least one characteristic in common with the first content item comprises:
a determination that the first content item is a first episode of a program and the second content item is a second episode of the program,
a determination that each of the first episode and the second episode includes a same character, and
a determination that each of the first episode and the second episode includes a same musician.

12. The non-transitory machine-readable medium of claim 11, wherein the operations further comprise:
obtaining the first content item from a creator of the first content item or from a third content provider,
wherein the distributing of the first content item with the first advertisement is responsive to the obtaining of the first content item.

13. The non-transitory machine-readable medium of claim 11, wherein the first content item is created by the first content provider.

14. The non-transitory machine-readable medium of claim 11, wherein the operations further comprise:
obtaining a capability associated with the second communication device; and
formatting the enhanced first content item in accordance with the capability, resulting in a formatted first content item,
wherein the distributing of the enhanced first content item via the second content provider comprises distributing the formatted first content item to the second communication device.

15. A method, comprising:
monitoring, by a processing system including a processor, a performance of a creative presented by a first plurality of client devices in conjunction with a distribution of a first content item via a first outlet;
determining, by the processing system, that the performance exceeds a threshold;
responsive to the determining that the performance exceeds the threshold and based on an examination of network traffic, identifying, by the processing system, a second outlet to distribute the first content item;
applying, by the processing system, a first enhancement to the first content item when the network traffic is at a first level and a second enhancement to the first content item when the network traffic is at a second level that is different from the first level, the applying resulting in an enhanced first content item, wherein the second enhancement is different from the first enhancement, and wherein the applying of the first enhancement results in the enhanced first content item having a first resolution and the applying of the second enhancement results in the enhanced first content item having a second resolution;

providing, by the processing system, the enhanced first content item to the second outlet responsive to the identifying of the second outlet;

identifying, by the processing system, a second content item responsive to the determining that the performance exceeds the threshold and based on a determination that the second content item shares at least one characteristic in common with the first content item; and providing, by the processing system, the second content item to the second outlet responsive to the identifying of the second content item, wherein the determination that the second content item shares at least one characteristic in common with the first content item comprises:

a determination that the first content item is a first episode of a program and the second content item is a second episode of the program, a determination that each of the first episode and the second episode includes a same character, and a determination that each of the first episode and the second episode includes a same musician.

16. The method of claim 15, further comprising:

obtaining, by the processing system, an acceptance from a first operator of the first outlet to provide the first content item to the second outlet;

soliciting, by the processing system, bids from a plurality of creative providers responsive to the obtaining of the acceptance;

obtaining, by the processing system, the bids from the plurality of creative providers responsive to the soliciting of the bids;

obtaining, by the processing system, a plurality of creatives from a subset of the plurality of creative providers in accordance with the obtaining of the bids; and providing, by the processing system, the plurality of creatives to the second outlet for inclusion in inventory of the first content item.

17. The method of claim 16, further comprising:

formatting, by the processing system, the plurality of creatives in accordance with the identifying of the second outlet, resulting in a formatted plurality of creatives, wherein the providing of the plurality of creatives to the second outlet comprises providing the formatted plurality of creatives to the second outlet.

18. The device of claim 1, wherein the operations further comprise:

obtaining the first content item from a first content provider and the second content item from a second content provider, wherein the distributing of the enhanced first content item with the second plurality of advertisements via the second outlet is based on an enrollment of the first content provider in a syndication service, wherein the enrollment is based on a payment of a subscription fee by the first content provider, wherein the enrollment stipulates a time range during which the first content item can be distributed, and wherein the enrollment stipulates a third outlet associated with a third content provider that cannot be used to distribute the first content item.

19. The device of claim 1, wherein the operations further comprise:

identifying a quality of service requirement, a quality of experience requirement, or a combination thereof, associated with a distribution of the enhanced first content item via the second outlet.

20. The device of claim 19, wherein the applying is based on the identifying of the quality of service requirement, the quality of experience requirement, or the combination thereof.

* * * * *